United States Patent [19]

Föller

[11] Patent Number: 4,598,861
[45] Date of Patent: Jul. 8, 1986

[54] BIMETALLICALLY CONTROLLED STEAM TRAP

[75] Inventor: Werner Föller, Stuhr, Fed. Rep. of Germany

[73] Assignee: Gestra Kondensatableiter GmbH & Co., Bremen, Fed. Rep. of Germany

[21] Appl. No.: 761,547

[22] Filed: Aug. 1, 1985

Related U.S. Application Data

[62] Division of Ser. No. 598,781, Apr. 10, 1984, Pat. No. 4,561,588.

[30] Foreign Application Priority Data

Apr. 16, 1983 [DE] Fed. Rep. of Germany ..... 33138885

[51] Int. Cl.[4] .............................................. F16T 1/04
[52] U.S. Cl. .................................... 236/59; 236/93 R
[58] Field of Search ................. 236/93 R, 59, 101 E, 236/101 B

[56] References Cited

U.S. PATENT DOCUMENTS

| | | |
|---|---|---|
| 2,764,353 | 9/1956 | Lavallee et al. ............. 236/59 |
| 3,790,076 | 2/1974 | Wichtel ................. 236/101 B X |
| 3,985,296 | 10/1976 | Fujiwara ......................... 236/59 |
| 4,347,975 | 9/1982 | Foller ............................. 236/59 |

FOREIGN PATENT DOCUMENTS

| | | |
|---|---|---|
| 1132400 | 6/1962 | Fed. Rep. of Germany ........ 236/59 |
| 1183514 | 12/1964 | Fed. Rep. of Germany ........ 236/59 |

Primary Examiner—William E. Tapolcai
Attorney, Agent, or Firm—Collard, Roe & Galgano

[57] ABSTRACT

A steam trap with a closure element or valve disposed on the low pressure side cooperating with a valve seat, the valve being actuated by a control unit disposed in the high pressure chamber of the steam trap. The control unit includes a plurality of bimetallic spring elements each having a support portion and an operative portion and different actuation temperatures which act on the valve stem to close the valve on the valve seat. The support portions of the bimetallic spring elements engage a stationary support of said steam trap and the operative portions thereof engage the valve stem. The engagement of the bimetallic spring elements with the valve stem is such that when the valve is closed by the action of the bimetallic spring elements having the higher actuation temperatures, the bimetallic spring elements having the lower actuation temperatures are unaffected thereby and thus not stressed by the spring forces of the bimetallic spring elements of the higher actuation temperatures.

4 Claims, 7 Drawing Figures

BIMETALLICALLY CONTROLLED STEAM TRAP

This application is a division of application Ser. No. 598,781 filed Apr. 10, 1984, now U.S. Pat. No. 4,561,588.

The present invention relates generally to a steam trap and, more particularly, it relates to a steam trap having a closure element disposed on the low pressure side cooperating with a valve seat and actuated by a control unit disposed in the high pressure chamber of the steam trap.

In order to prevent erosion of the closure element and to reduce contamination in steam traps, it is necessary that the closure element open to its greatest extent at the commencement of the opening process and close completely during discharge of the condensate. It is also desirable to maintain this opening and closing function within a wide range of pressures for any particular steam trap so that a limited number of steam traps are required for all applications.

In U.S. Pat. No. 4,347,975, granted Sept. 7, 1982 to the applicant herein, there is disclosed a steam trap which utilizes a plurality of bimetallic spring elements arranged in series. In this prior art steam trap, when the individual bimetallic element actuation temperature is reached, the closure element closes, and when the temperature falls below this actuation temperature, the closure element closes. The bimetallic spring elements utilized are in the form of spring discs which move in a snap-like manner from a concave arch to a convex arch at the actuation temperature of the element. In the steam trap construction of this prior art patent, the lower actuation temperature or weaker spring elements effect closing of the closure element at the lower temperature and pressure while at higher temperatures and pressures the correspondingly stronger spring elements effect closing. In the latter case, the stronger spring elements also inhibit the closing movement of the weaker spring elements so that as a result the weaker spring elements are exposed at the high temperatures and pressures to extremely high stresses. Thus, the range of pressures for which this prior art steam trap is applicable is limited.

It is, therefore, an object of the present invention to provide a steam trap controlled by bimetallic spring elements which may be used within a wide range of pressures without any of the bimetallic spring elements being subjected to undesirably high stresses.

This object, as well as others which will hereinafter become apparent, is accomplished in accordance with the present invention by providing a steam trap having a closure element or valve disposed on the low pressure side of the steam trap cooperating with a valve seat, the closure element being actuated through a shaft or valve stem by a control unit disposed in the high pressure chamber of the steam trap. The control unit consists of a plurality of bimetallic spring elements wherein the support portions of the spring elements are supported in a stationary manner with respect to the control unit. The operative portions of the spring elements engage the shaft of the closure element in such a manner that when the closure element is closed by the action of the spring elements having the higher actuation temperatures, the spring elements having the lower actuation temperatures are not affected thereby and are therefore not stressed by the spring forces of the spring elements having the higher actuation temperatures. The maximum stroke path or movement of the closure element is less than the maximum stroke or closing movement of each individual bimetallic spring element. The forces of the individual bimetallic spring elements act so that their effect is additive on the closure element as soon as their respective actuation temperatures have been exceeded. The steam trap can, therefore, be used in a wide pressure range, without there being any undesirably high stresses acting on any of the bimetallic spring elements.

It is another object of the present invention that by designing the minimum and maximum spring force isotherms of the bimetallic spring elements to coincide, because of the resultant sum of the forces, the difference between the maximum and minimum is responsible for the strongest closing movement of the bimetallic elements.

It is yet another object of the present invention that the position of the maximum spring force isotherm corresponds to or goes beyond the closure position of the closure element so as to result not only in the highest possible seating forces at the closure element following closure, but also in an abrupt opening when the temperature is lowered, without there being a gradual movement thereof.

It is yet a further object of the present invention to provide different actuation temperatures for the individual bimetallic spring elements so that the bridging of a large inlet pressure region is not obtained by a linear force increase, but rather there occurs a polygonal-like variation of the respective forces and actuation temperatures associated with one another, so that the steam trap opens and closes at respective temperature differences from the steam saturation curve, which are almost equal to one another.

It is yet another object of the present invention to permit adjustment of the individual metallic spring elements by means of the supports associated therewith. By this means, less demanding manufacturing precision of the bimetallic spring elements is necessary, since, for example, any strokes deviating from a nominal setting can be compensated for by relative adjustment of the supports.

Other objects and features of the present invention will become apparent from the following detailed description when taken in connection with the accompanying drawings which disclose two embodiments of the invention. It is to be understood that the drawings are designed for the purpose of illustration only and are not intended as a definition of the limits of the invention.

In the drawings, wherein similar reference characters denote similar elements throughout the several views.

Figure 1:
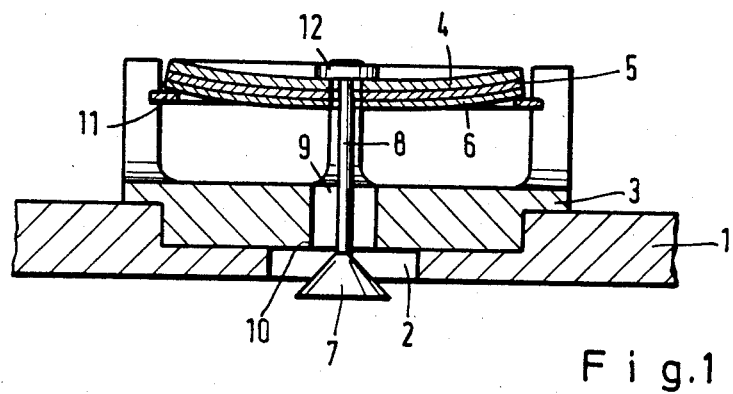
FIG. 1 is a cross-sectional view of a first embodiment of the control unit of the steam trap according to the present invention in the open position.
Figure 2:
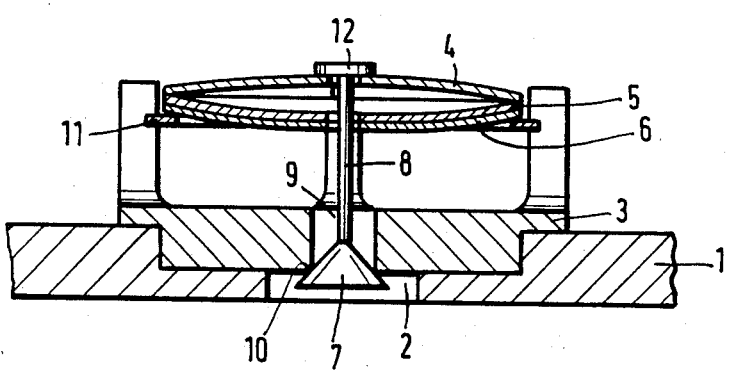
FIG. 2 is a cross-sectional view of the control unit of FIG. 1 in the closed position at a low operating pressure.
Figure 3:
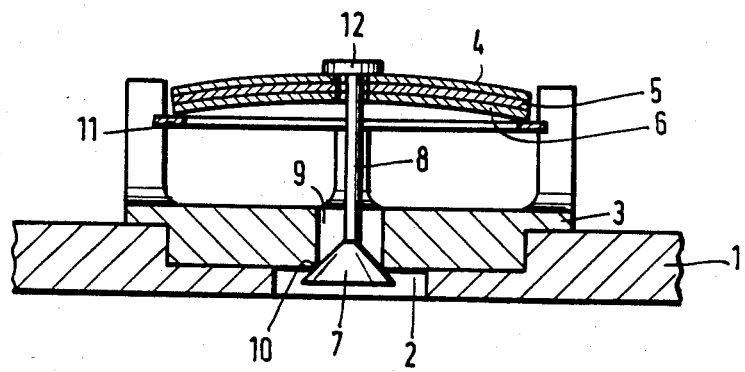
FIG. 3 is a cross-sectional view of the control unit of FIG. 1 in the closed position at a high operating pressure.

Now turning to the drawings, there is shown in FIGS. 1 to 3 a separating wall 1 between the inlet high pressure side and the low pressure side of a non-illustrated steam trap housing. Separating wall 1 is formed with a passage 2 for the condensate to be discharged, and which carries a control unit. This control unit includes a seat element 3, three centrally apertured, disc-shaped bimetallic spring elements 4, 5 and 6 disposed on the inlet side, a closure element or valve 7 disposed on the low pressure side, and a shaft or valve stem 8 for valve 7. Seat element 3 is formed with a central passage 9 and a valve seat 10 with which valve 7 cooperates.

As clearly seen in FIGS. 1, 2 and 3, seat element 3 includes a locally stationary support 11 which engages the exterior rims or support portions of bimetallic spring elements 4, 5 and 6, while the inner rims or operative portions of the spring elements engage a support 12 of valve stem 8.

In the cold state, all three bimetallic spring elements 4, 5 and 6 are bent or arched concavely towards valve seat 10, as clearly seen in FIG. 1, and valve 7 is in the open position releasing passage 9 so that the condensate can be discharged. At increasing temperature, bimetallic spring elements 4, 5 and 6 move gradually at first in a closure direction, until their respective actuation temperature is reached, at which time they snap through in a closing movement to a convex arch.

Figure 4:
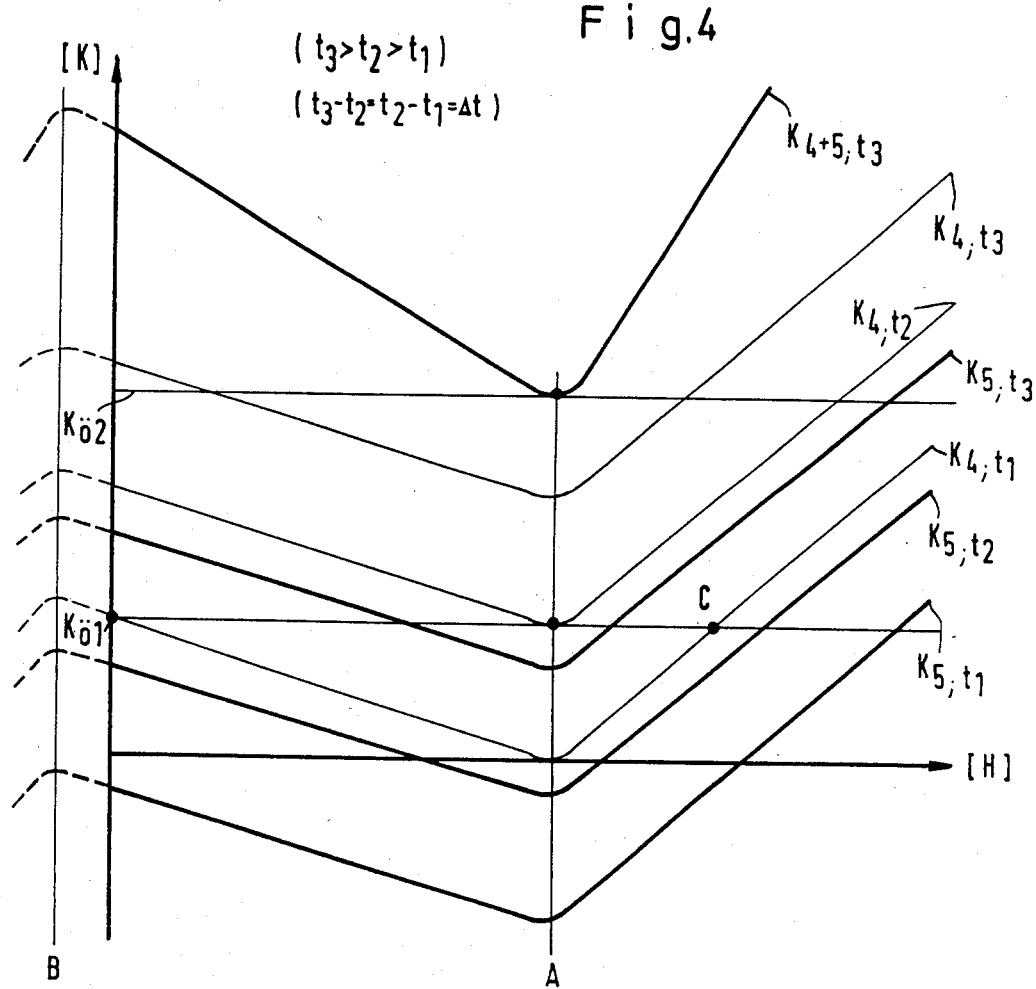
FIG. 4 is a diagram showing bimetallic spring force isothermal lines, which are applied along a partial closure stroke.

In the case where bimetallic spring elements 4, 5 and 6 have different respective actuation temperatures, the opening and closing processes are shown diagrammatically in FIG. 4. On the abscissa of the graph of FIG. 4, there are shown strokes H of the bimetallic spring elements 4, 5 and 6, as well as of valve 7. The coordinate zero point corresponds to the closed position. On the ordinate there are shown forces, wherein $K_4$ denotes the spring forces which may be exerted by bimetallic spring element 4 on valve 7 at, for example, temperatures $t_1$ to $t_3$, while $K_5$ shows the appropriate spring forces of bimetallic spring element 5. The curves shown in the diagram for $K_4$ and $K_5$ form spring force isotherms. The spring forces $K_4$ and $K_5$ act in a closure direction as long as the spring force isotherms come to lie on the positive ordinate. They act, theoretically, in the opening direction, if they are negative. Since the bimetallic spring elements 4, 5 and 6 engage supports 11 and 12 only on one side, these negative forces are not, however, transferable to valve 7.

The force determined by the pressure gradient across valve 7, and which acts on valve 7 in an opening direction, is identified by $K_ö$. It is substantially independent of the stroke.

The position or stroke of valve 7 is determined by the equilibrium of the opening pressure force $K_{e,uml/o/}$, and by the spring forces $K_4$, $K_5$ and $K_6$ of the bimetallic spring elements 4, 5 and 6 or their sums, and can only lie at the point of intersection of the force lines for the prevailing temperatures and pressures.

If there are, therefore, at opening forces up to $K_{ö1}$ temperature increases from $t_1$ to $t_2$, then bimetallic spring element 4 gradually moves valve 7 from the open position (right in the diagram) up to the stroke position A, so as to carry it from that position in an abrupt manner into the closed position. The bimetallic spring elements 5 and 6 remain during that period in a shape which is convex towards valve seat 10 and thus unstressed, as seen in FIG. 2. The forces $K_4$ associated with the various respective closure actuation temperatures are formed on the vertical A, which passes through the minima of the spring force isothermal lines. This association leads, in the diagram of FIG. 5, to a first straight line 13.

At higher temperature than $t_2$, for example, at a temperature $t_3$, bimetallic spring element 5 is also in a position to exert positive force over the entire stroke range, namely forces acting in a closing direction. These spring force isotherms of bimetallic spring elements 4 and 5 are therefore added into a resultant "$K_{4+5,t3}$". If the temperature rises up to $t_3$ at any higher opening pressure forces than $K_{ö1}$, for example, at the force $K_{ö2}$, bimetallic spring elements 4 and 5, jointly move valve 7 gradually from the open position up to the position A, so as to thereafter bring it abruptly into the closed position. Here, the bimetallic spring element 6 remains concavely arched towards valve seat 10.

Figure 5:
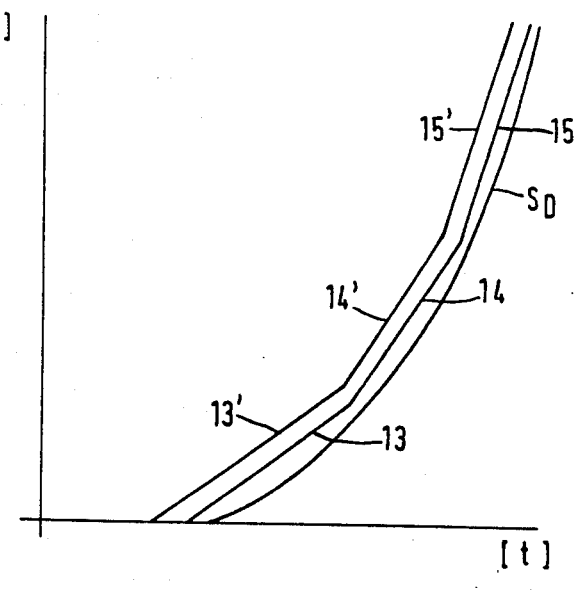
FIG. 5 is a diagram showing a steam saturation curve, as well as the closing and opening temperatures.

Consequently, on the vertical, passing through A, the forces of bimetallic spring elements 4 and 5 are added, so that the difference of the forces increases at the same temperature t. In the diagram of FIG. 5, there arises a second straight line 14 having a greater slope. The same is repeated accordingly, if bimetallic spring element 6 also becomes effective (FIG. 3), as a result of which there arises a third and still steeper stright line 15 of the polygonal segment shown in FIG. 5.

From FIG. 4 it will be apparent that the opening process represents a reversal of the closing process. If the maxima of the spring force isothermal lines correspond to the closed position, or are on the other side thereof, for example, are on the vertical passing through B, then the steam trap is opened, for example, at the force $K_{ö1}$ from the closure position "closed" up to the point C in a jump-like or abrupt manner, as soon as the temperature of the bimetallic spring element 4 has fallen from $t_2$ to $t_1$. In the diagram of FIG. 5, there therefore arises a second polygonal segment 13', 14', 15' for the opening process, which only lies somewhat lower in temperature. The curve $S_D$ shown in FIG. 5 shows the respective steam saturation temperatures for different respective pressures, at which the steam trap must be closed at the latest.

The diagram of FIG. 5 shows that the desired effect is attained over a large pressure range. This is possible because the individual bimetallic spring elements 4, 5 and 6 act independently of one another with respect to the force flow from the stationary support 11 to the support 12 disposed on the closure element shaft 8. As a result thereof, the weaker bimetallic spring elements 4 and 5 are not subjected to the greater spring forces of the stronger bimetallic spring elements 5 and 6 and therefore are not subjected to undesirably high stresses.

Figure 6:
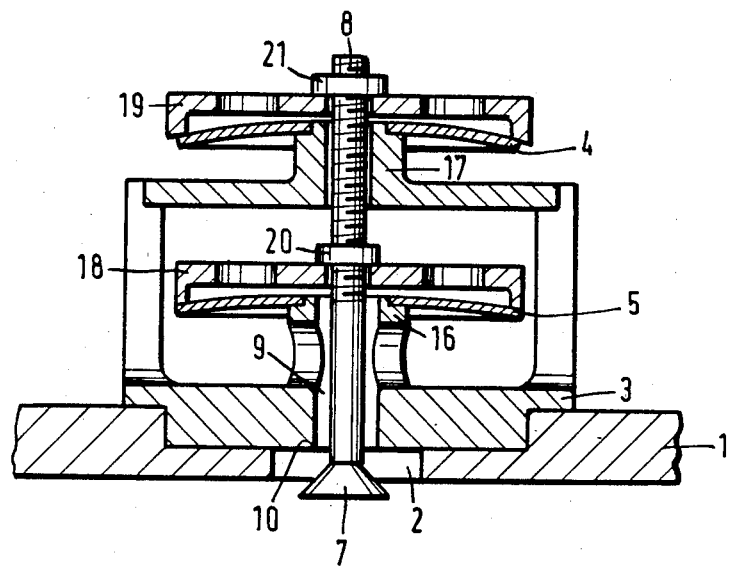
FIG. 6 is a cross-sectional view of a second embodiment of the control unit of the steam trap according to the present invention in the open position.
Figure 7:
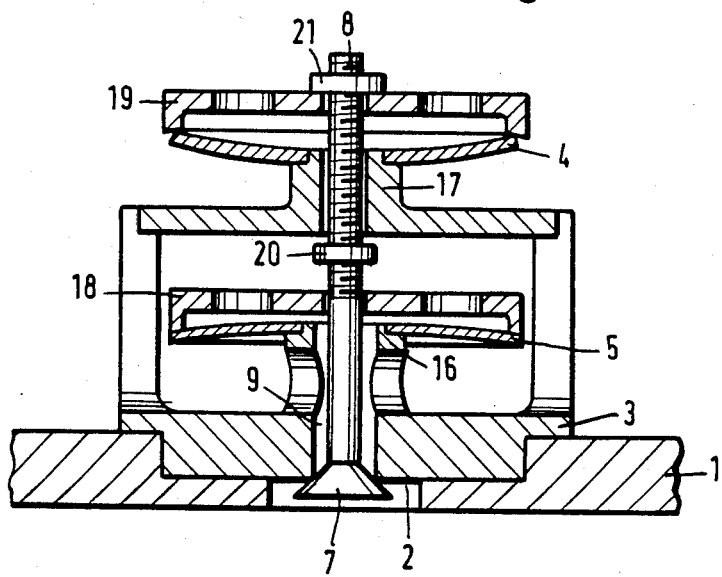
FIG. 7 is a cross-sectional view of the control unit of FIG. 6 in the closed position at a low operating pressure.

In the embodiment form according to FIGS. 6 and 7, seat element 3 carries two centrally disposed, stationary supports 16 and 17. The inner rims, in this case the support portions, of bimetallic spring elements 4 and 5 engage each of these supports. Disk shaped cross-pieces 18 and 19 grip the outer rims or operative portions of both bimetallic spring elements 5 and 4, respectively, the cross-pieces 18 and 19 in turn act with their inner rims on two supports 20 and 21, respectively, disposed on valve stem 8. Supports 20 and 21 are adapted to be axially displaceable for the purpose of adjusting the strokes of the bimetallic spring elements 4 and 5.

At increasing temperatures, as has already been described with respect to FIGS. 1 to 3, bimetallic spring elements 4 and 5 initially move gradually from the open position to the closed position. Upon reaching its associated actuation temperature, bimetallic spring element 4 snaps through and lifts, through cross-piece 19 and support 21 of stem 8, the closure element or valve 7 to the closed position. Bimetallic spring element 5 retains its shape during this time, which is concavely arched towards valve seat 10. It is to be noted that during this closure stroke of valve 7, support 20 is lifted from cross-piece 18, as seen in FIG. 7 so that no unnecessary stress is imparted to spring element 5. At greater opening forces of valve 7, namely at higher pressures and correspondingly higher temperatures, both bimetallic spring elements 4 and 5 snap through in a closing movement, and cause cross-pieces 18 and 19 to engage supports 20 and 21, so that the sum of their closure forces acts on valve 7. In this case, what has already been stated regarding matching of the polygonal segment of the straight closure lines 13 and 14 (FIG. 5) of bimetallic spring elements 4 and 5 to the steam saturation curve $S_D$, remains valid.

Thus, while only one embodiment of the present invention has been shown and described, it will be obvious that many changes and modifications may be made thereunto, without departing from the spirit and scope of the invention.

What is claimed is:

1. In a steam trap having a closure valve disposed on the low pressure side cooperating with a valve seat, said valve being normally open at lower operating temperatures, a valve stem for said valve, a control unit disposed in the unit pressure side of said steam trap acting on said valve stem to close said valve at elevated temperatures, said control unit including a plurality of bimetallic spring elements in the form of bimetallic spring discs having an outer peripheral rim and an inner rim defined by a central aperture, the outer peripheral rim defining an operative portion of said bimetallic spring elements and the inner rim defining a support portion of said bimetallic spring elements, said bimetallic spring elements having different actuation temperatures, support means for supporting the support portions of said bimetallic spring elements in a stationary manner with respect to said steam trap, and means for engaging the operative portions of said bimetallic spring elements with the valve stem of said closure valve so that in a first partial range within the operating range of the steam trap, only one of the bimetallic spring elements is activated to exert a closing force on said closure valve, while in other partial ranges within the operating range of the steam trap at least another bimetallic spring element is activated to exert a closing force on said closure valve in addition to the closure force exerted by said bimetallic spring element activated in said first partial range, the improvement comprising:
   (a) said bimetallic spring elements being bimetallic snap elements having mutually different snap temperatures;
   (b) said support means for supporting the support portions of said bimetallic snap elements includes a support element fixed with respect to said steam trap for each bimetallic snap element;
   (c) said means for engaging the operative portions of said bimetallic snap elements with the valve stem of said closure valve includes a support on the valve stem of said closure valve for each bimetallic snap element; and
   (d) means for adjusting each support engaging the operative portions of said bimetallic snap elements; each support element for the support portions of said bimetallic snap elements and each support for the operative portions of said bimetallic snap elements being so disposed with respect to one another that the closure valve closes on said valve seat within the closure stroke of each bimetallic snap element at the latest at the maximum of the spring force isotherms of the bimetallic snap elements.

2. The steam trap according to claim 1, wherein said means for engaging the operative portions of said bimetallic spring elements with the valve stem of said closure valve comprises support means on said valve stem which engage said operative portions of said bimetallic spring elements so that said spring elements act upon said valve only in a closure direction.

3. The steam trap according to claim 1, wherein said different bimetallic spring elements consist of bimetalls of different respective specific thermal deflections.

4. The steam trap according to claim 1, wherein the maximum of the spring force isotherms of the bimetallic spring elements coincide in a first stroke position, and the minimum spring force isotherms of the bimetallic spring elements coincide in a second stroke position, wherein said stroke positions relate to the movement of said closure valve.

* * * * *

UNITED STATES PATENT AND TRADEMARK OFFICE
CERTIFICATE OF CORRECTION

PATENT NO. : 4,598,861
DATED : JULY 8, 1986
INVENTOR(S) : WERNER FÖLLER

It is certified that error appears in the above-identified patent and that said Letters Patent are hereby corrected as shown below:

Column 5, line 36, change "unit pressure" to --high pressure--.

Signed and Sealed this

Twenty-first Day of October, 1986

[SEAL]

Attest:

DONALD J. QUIGG

Attesting Officer

Commissioner of Patents and Trademarks